(12) United States Patent
Hasebe et al.

(10) Patent No.: US 7,093,853 B2
(45) Date of Patent: Aug. 22, 2006

(54) AIRBAG, AIRBAG DEVICE AND VEHICLE

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 134 days.

(21) Appl. No.: 10/771,347

(22) Filed: Feb. 5, 2004

(65) Prior Publication Data

US 2004/0155439 A1 Aug. 12, 2004

Related U.S. Application Data

(63) Continuation-in-part of application No. 10/671,801, filed on Sep. 29, 2003.

(30) Foreign Application Priority Data

Jan. 23, 2003 (JP) .............................. 2003-015108
Dec. 11, 2003 (JP) .............................. 2003-413504

(51) Int. Cl.
*B60R 21/16* (2006.01)

(52) U.S. Cl. .................................................. 280/743.1
(58) Field of Classification Search ............. 280/743.1, 280/730.1, 728.2, 731, 732, 743.2
See application file for complete search history.

(56) References Cited

U.S. PATENT DOCUMENTS 5,125,682 A * 6/1992 Hensler et al. .......... 280/730.1
5,213,361 A 5/1993 Satoh et al.
5,934,701 A 8/1999 Furukawa
6,505,851 B1 * 1/2003 Frisch ...................... 280/728.3
6,536,801 B1 * 3/2003 Frisch ...................... 280/743.1
6,540,254 B1 * 4/2003 Bieber et al. ................ 280/732
6,554,317 B1 * 4/2003 Lorenz et al. ............ 280/743.1
6,588,798 B1 * 7/2003 Bohn et al. .............. 280/743.1
6,595,549 B1 * 7/2003 Bohn et al. .............. 280/743.1
6,726,245 B1 * 4/2004 Fellhauer et al. ........ 280/743.2
6,802,534 B1 10/2004 Neupert
2001/0011810 A1 8/2001 Saiguchi et al.
2002/0084631 A1 * 7/2002 Lorenz et al. ............ 280/728.2
2002/0084638 A1 * 7/2002 Neupert ................... 280/743.1
2002/0084640 A1 * 7/2002 Bohn ....................... 280/743.1
2002/0084641 A1 * 7/2002 Fellhauer et al. ........ 280/743.1
2002/0195809 A1 * 12/2002 Bieber et al. ............. 280/743.1
2003/0218325 A1 * 11/2003 Hasebe et al. ........... 280/743.2
2003/0230883 A1 * 12/2003 Heym ...................... 280/743.1

FOREIGN PATENT DOCUMENTS

JP 4-292239 10/1992
JP 04292239 A * 10/1992
JP 49023176 B 1/1997

* cited by examiner

*Primary Examiner*—Faye M. Fleming
(74) *Attorney, Agent, or Firm*—Manabu Kanesaka

(57) ABSTRACT

An airbag device includes an airbag and an inflator disposed at a side of a base portion of the airbag for inflating the airbag. The airbag includes a left half airbag with a vent hole to be inflated at a front left of a vehicle occupant, and a right half airbag with a vent hole to be inflated at a front right of the vehicle occupant. The distal ends of the left half airbag and the right half airbag are spaced part from each other to form an empty space therebetween facing the vehicle occupant when the airbag is inflated.

15 Claims, 6 Drawing Sheets

AIRBAG, AIRBAG DEVICE AND VEHICLE

CROSS REFERENCE TO RELATED APPLICATION

This is a continuation-in-part application of patent application Ser. No. 10/671,801 filed on Sep. 29, 2003.

BACKGROUND OF THE INVENTION AND RELATED ART STATEMENT

The present invention relates to an airbag for protecting a vehicle occupant in the event of vehicle collision, and specifically relates to an airbag having a left half airbag to be inflated at a front left of the occupant, and a right half airbag to be inflated at a front right of the occupant. The present invention also relates to an airbag device provided with the airbag and a vehicle provided with the airbag device.

Japanese Patent Publication (KOKAI) No. 04-292239 has disclosed an airbag for protecting a vehicle occupant in the event of vehicle collision. The airbag has a left half airbag to be inflated at a front left of the occupant, and a right half airbag to be inflated at the front right of the occupant. A common inflator inflates both the left half and right half airbags. In the airbag, a distal end of the left half airbag is connected to a distal end of the right half airbag with a tie panel.

The airbag is folded in a case and covered with a cover. In the event of vehicle collision, an inflator, i.e. a gas generator, injects gas to inflate the airbag rapidly in front of the occupant by pushing and opening the cover.

The inflator is disposed at an inside or outside of a base portion of the airbag. In an airbag device having an inflator disposed at an outside of the base portion of the airbag, the gas from the inflator is supplied into the airbag through a gas inlet disposed at the base portion side of the airbag. In an airbag device having an inflator disposed at an inside of the base portion side of the airbag, the inflator is entirely or partially disposed in the airbag. An example of the latter case includes a configuration in which a pair of slit openings is formed in the airbag, and a rod inflator passes through the slit openings, so that both ends of the inflator expose at the outside of the airbag.

As airbags for protecting vehicle occupants, there are a curtain airbag to be expanded along a side portion of a vehicle cabin (side door or B pillar), a knee airbag to be expanded in front of a leg of an occupant, a side airbag to be expanded toward a side of an occupant, and a seat cushion airbag to be expanded at a lower front side of a seat cushion to left or harden a front portion of the seat cushion. The seat cushion bag lifts or hardens the front portion of the seat cushion to prevent so-called submarine phenomena in which an occupant slides down under a seat belt in case of vehicle collision. Japanese Patent Publication (KOKAI) No. 2001-247010 has disclosed such a seat cushion airbag.

In the airbag disclosed in Japanese Patent Publication No. 04-292239, the distal ends of the left half and right half airbags are connected with the tie panel. Therefore, when the airbag is inflated, the tie panel receives a center part of the vehicle occupant's body in the lateral direction. When the left half and right half airbags are inflated, a larger amount of the gas may flow in one of the half airbags from the inflator, and then the other of the half airbags is inflated later than the one of the half airbags.

As described above, the distal ends of the left and right half airbags are connected with the tie panel. Accordingly, it is expected that when one of the half airbags is inflated faster than the other, the one of the half airbags may facilitate the other of the half airbags to be inflated by pulling the other of the half airbags through the tie panel. As described above, however, the tie panel connects the distal ends of the left and right half airbags. Therefore, the one of the half airbags does not sufficiently pull the other of the half airbags through the tie panel until the one of the half airbags is inflated up to the distal end.

In view of the problem described above, an object of the present invention is to provide an airbag wherein a left half airbag and a right half airbag are inflated smoothly and substantially uniformly toward left and right sides from an early stage of the inflation.

Another object of the invention is to provide an airbag having a vent hole at an appropriate position.

A further object of the invention is to provide an airbag device provided with such an airbag and a vehicle provided with the airbag device.

Further objects and advantages of the invention will be apparent from the following description of the invention.

SUMMARY OF THE INVENTION

According to the present invention, an airbag device includes an airbag and an inflator disposed at a side of a base portion of the airbag for inflating the airbag. The airbag is inflated such that a distal end thereof extends away from the base side of the airbag. The airbag includes a left half airbag to be inflated at a front left of a vehicle occupant, and a right half airbag to be inflated at a front right of the vehicle occupant. The left half airbag has a distal end connected with a distal end of the right half airbag, and a space facing the vehicle occupant is formed between the distal ends of the left and right half airbags when the airbag is inflated.

In the invention, when the airbag is inflated, a distance between the distal ends of the left and right half airbags may be 150 to 450 mm. Also, a distance from the distal ends to a deepest bottom of the space may be 280 to 480 mm.

According to the present invention, the left half airbag may be connected with the right half airbag at base portions thereof surfaces, so that a common inflator inflates the left and right half airbags.

According to the present invention, the left half airbag may be connected with the right half airbag at middle portions thereof in a direction that the airbag expands. When the airbag is inflated, a distance from the distal ends of the left and right half airbags to the connected middle portions may be 50 to 300 mm. The left and right half airbags are formed of a plurality of panels joined with each other. The panels are joined at joined portions at an outside of the middle portions of opposing surfaces of the half airbags.

According to the present invention, the airbag may include vent holes in outer side surfaces at upper front areas from middle portions of the side surfaces.

According to the present invention, an airbag device is provided with the airbag of the invention and an inflator for inflating the airbag. In the airbag device, the airbag is inflated at a maximum pressure less than 440 kPa.

According to the present invention, a vehicle is provided with the airbag device. In the vehicle, the airbag device may be installed in an instrumental panel of the vehicle as a passenger side airbag. A vent hole is formed in a side surface of the airbag facing outwardly. When the airbag is inflated, a horizontal distance L1 between a rear edge of the instrumental panel and the vent hole and a horizontal distance L2 between the rear edge and the distal end of the airbag has a ratio (L2/L1) of 0.25 to 0.5. Also, when the airbag is inflated, a vertical distance H1 between an upper edge of the instrumental panel and the vent hole and a vertical distance H2 between the upper edge and the distal end of the airbag has a ratio (H2/H1) of 0.3 to 0.5.

In the airbag, the airbag device and the vehicle of the present invention, when the airbag is inflated, the left half airbag receives the left side of the occupant's thorax and the right half airbag receives the right side of the occupant's thorax. The left and right sides of the thorax have hard and strong rib bones. The airbag receives and absorbs an impact on the occupant through the rib bones. In the inflated state, the airbag has the space between the distal ends of the left and right half airbags, and the space faces a central portion of the occupant's thorax where a breastbone is situated. Accordingly, when the occupant's body plunges into the airbag, the portion around the breastbone does not receive a strong impact, thereby decreasing a load on the breastbone.

In the present invention, the distance between the distal ends of the left half and right half airbags is set to be 150 to 450 mm when the airbag is inflated. As a result, the left half airbag faces a center of the left side of the thorax and the inflated right half airbag faces a center of the right side of the thorax, thereby securely receiving the occupant's upper body around the rib bones. Also, the distance from the distal ends to the deepest bottom of the space is set to be 280 to 480 mm, thereby decreasing a load on the breastbone.

In the present invention, a common inflator may be provided for inflating both the left half airbag and the right half airbag, thereby reducing the number of the inflators and a manufacturing cost.

In the present invention, the left half airbag is connected with the right half airbag at the middle portions of the surfaces facing each other in a direction that the airbag deploys. When the airbag is inflated, a distance from the distal ends of the left and right half airbags to the connected middle portions may be 50 to 300 mm. With such a configuration, when one of the half airbags inflates later, the other of the half airbags facilitates the one of the half airbags to be inflated by pulling the one of the half airbags. Also, the one of the half airbags starts to pull the other of the half airbags in the direction of deployment at an early stage when the one of the half bags is inflated up to the middle. Accordingly, both of the left and right half airbags are inflated smoothly and substantially uniformly toward left and right sides from the early stage of the inflation. Further, the connected portions are located at a deep position in the space between the left and right half airbags, so that the joined portions do not apply a load on the breastbone.

In the present invention, the left and right half airbags are formed of a plurality of the joined panels. The panels are joined at the joined portions at an outside and the middle of the airbag in the direction of deployment. The joined portions at the middle of the opposing surfaces of the left and right half airbags may be connected. In this case, a tie panel for connecting the left half airbag and the right half airbag is not necessary, thereby reducing a cost of the airbag.

In the present invention, the vent holes are provided for discharging gas therethrough upon receiving the occupant, thereby absorbing the impact on the occupant. The vent holes are formed in the outer side surfaces at the upper front areas from the middle portions of the side surfaces. When the airbag is inflated, the horizontal distance L1 between the rear edge of the instrumental panel and the distal end of the airbag and the horizontal distance L2 between the rear edge of the instrument panel and the vent hole has a ratio (L2/L1) of 0.25 to 0.5. Also, when the airbag is inflated, the vertical distance H1 between an upper edge of the instrumental panel and the upper edge of the airbag and the vertical distance H2 between the upper edge and the vent hole has a ratio (H2/H1) of 0.3 to 0.5. When the vent holes are located at the relatively upper front areas, it is possible to securely prevent the discharged gas through the vent holes from affecting the occupant. Further, when the ratio (L2/L1) is 0.25 to 0.5 and the ratio (H2/H1) is 0.3 to 0.5, the vent holes do not closely contact an interior of the vehicle such as a door glass or A pillar, so that the gas is smoothly discharged through the vent holes.

In the present invention, it is possible to protect the occupant even when the airbag is inflated with a relatively low gas pressure. When the airbag is inflated with the maximum pressure less than, for example, 440 kPa, it is still possible to protect the occupant. The vehicle provided with the airbag may be further provided with a curtain airbag device, a knee airbag device, a knee protector or a seat cushion bag device to protect the occupant.

BRIEF DESCRIPTION OF THE DRAWINGS

FIGS. 1(a) and 1(b) are views showing an airbag according to an embodiment of the present invention, wherein FIG. 1(a) is a perspective view of the airbag in an inflated state, and FIG. 1(b) is a sectional view taken along line 1(b)—1(b) in FIG. 1(a);

DETAILED DESCRIPTION OF PREFERRED EMBODIMENTS

Figure 1A:
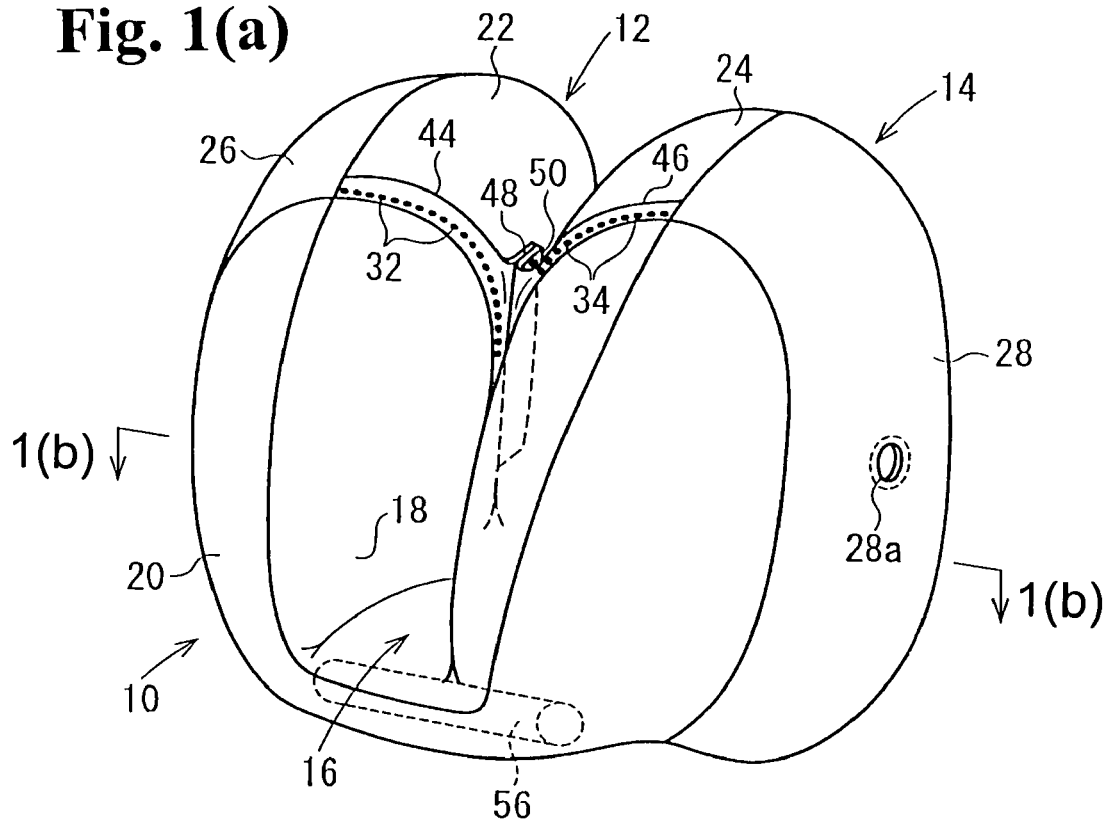
Figure 1B:
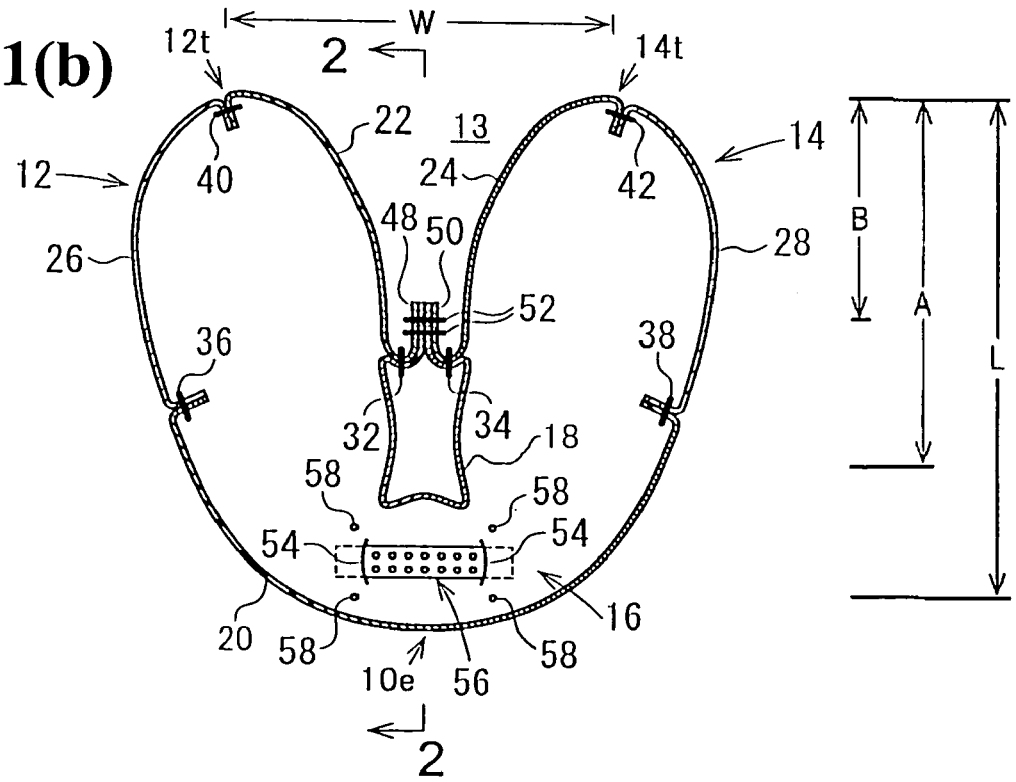
Figure 2:
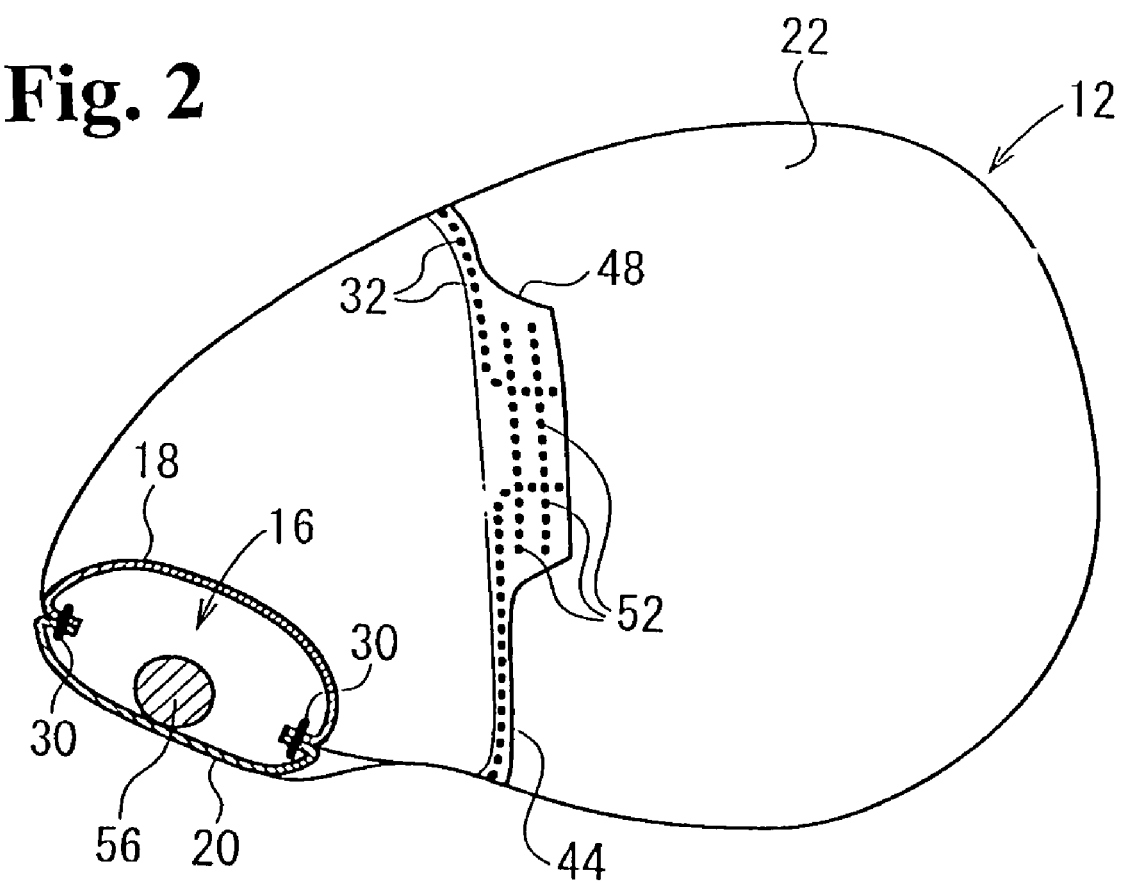
FIG. 2 is a sectional view taken along line 2—2 in FIG. 1(b)
Figure 3A:
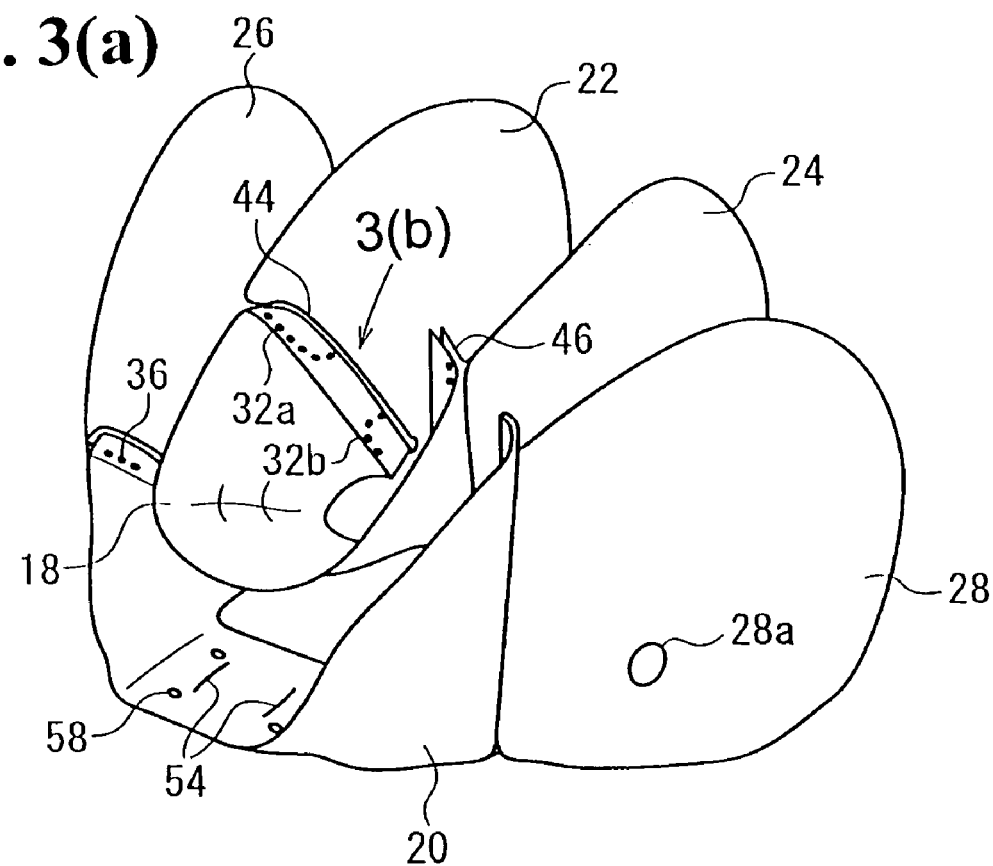
FIG. 3(a) is an exploded perspective view of the airbag shown in FIG. 1(a)
Figure 3B:
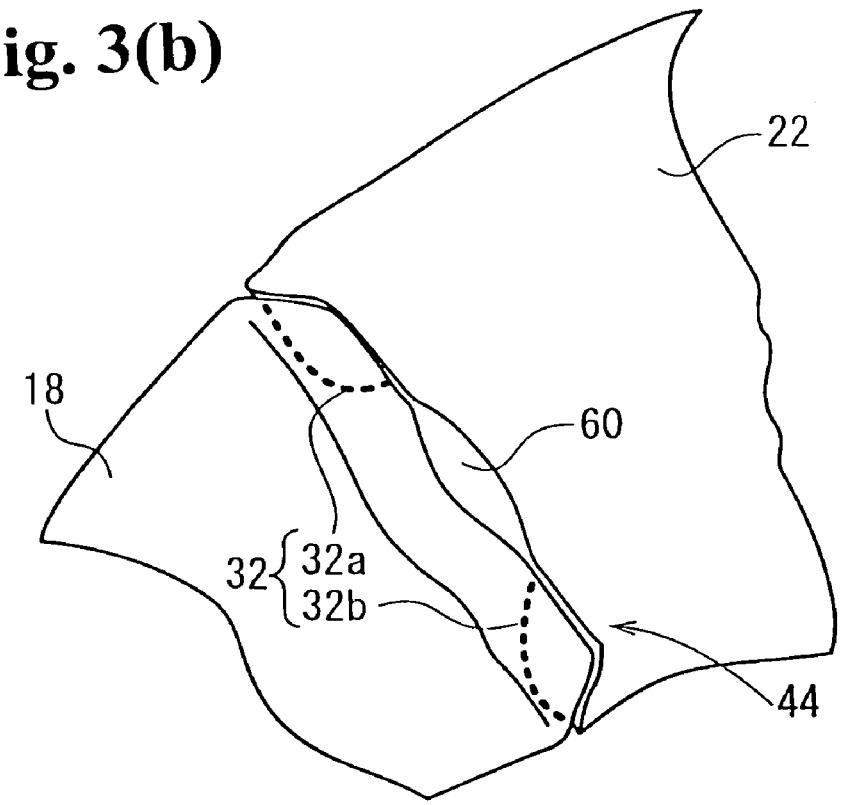
FIG. 3(b) is an enlarged view of a part 3(b) of the airbag shown in FIG. 1(a)

Hereunder, embodiments of the present invention will be described with reference to the accompanying drawings. FIG. 1(a) is a perspective view of an inflated airbag according to an embodiment of the present invention, and FIG. 1(b) is a sectional view taken along line 1(b)—1(b) in FIG. 1(a). FIG. 2 is a sectional view taken along line 2—2 in FIG. 1(b). FIG. 3(a) is an exploded perspective view of the airbag, and FIG. 3(b) is an enlarged view of a portion 3(b) in FIG. 3(a).

An airbag 10 includes a right half airbag 12 to be inflated at a front right of a vehicle occupant, a left half airbag 14 to be inflated at a front left of the occupant, and a communicating portion 16 for communicating an end of the right half airbag 12 with an end of the left half airbag 14. The communicating portion 16 is located at a side of a base of the airbag 10. Accordingly, the right half airbag 12 and the left half airbag 14 are inflated toward a direction that the half airbags move away from the communicating portion 16.

In the inflated state of the airbag 10, a bridge component such as a tie panel is not disposed between the distal ends of the right half airbag 12 and the left half airbag 14. A space 13 between the distal ends of the right half airbag 12 and the left half airbag 14 is open toward the occupant (i.e. upward in FIG. 1(b)). A distance W between a distal end 12t of the right half airbag 12 and a distal end 14t of the left half airbag 14 preferably ranges from 150 to 450 mm, and more preferably ranges from 170 to 430 mm. A horizontal distance A between the distal ends 12t and 14t and the deepest bottom of the space 13 preferably ranges from 280 to 480 mm, and more preferably ranges from 310 to 450 mm.

In the airbag 10, the right half airbag 12 is connected with the left half airbag 14 with seams 52 at midsections thereof in a direction that the airbag is inflated. A horizontal distance B between the distal ends 12t and 14t and the seams 52 is preferably ranges from 50 to 300 mm, and more preferably ranges from 90 to 260 mm.

According to the embodiment, the airbag 10 is composed of panels 18, 20, 22, 24, 26, and 28, and the panels are stitched together. The panels 26 and 28 are provided with vent holes 26a and 28a (26a is not shown), respectively. As shown in FIG. 1(*a*), the vent holes 26a and 28a are formed in side surfaces of the airbags 12 and 14 facing outwardly. The vent hole 26a formed in the panel 26 (not shown) is located at a position symmetrical to that of the vent hole 28a.

A configuration of the panels will be described next in detail. As shown in FIG. 3(*a*), the panel 18 (rear inner panel) constitutes rear inner surfaces of the right half airbag 12 and left half airbag 14 from the midsections in the direction of inflation, and an inner central surface of the communicating portion 16. The panel 20 (rear outer panel) constitutes a surface (outer surface of the airbag) opposite to the rear inner panel 18.

The panels 22 and 24 (front inner panels) constitute front inner surfaces of the right half airbag 12 and the left half airbag 14 from the midsections in the direction of inflation (opposing surfaces of the right half airbag 12 and the left half airbag 14). The panels 26 and 28 (front outer panels) constitute front outer surfaces (outer faces of the airbag) opposite to the front inner panels 22 and 24.

The rear inner panel 18 and the rear outer panel 20 are stitched with seams 30 (stitching threads). The rear inner panel 18 and the front inner panel 22 are stitched with a seam 32. The rear inner panel 18 and the front inner panel 24 are stitched with a seam 34. The rear outer panel 20 and the front outer panel 26 are stitched with a seam 36. The rear outer panel 20 and the front outer panel 28 are stitched with a seam 38.

A vent hole 28a for the left half airbag is disposed in the front outer panel 28. Although not shown in the drawings, a similar vent hole for the right half airbag is disposed in the front outer panel 26.

As shown in FIG. 1(*a*), seam allowances (joint portions) 44 and 46 connect the rear inner panel 18 and the front inner panel 22, and the rear inner panel 18 and the front inner panel 24, respectively, and are exposed at an outside of the right half airbag 12 and the left half airbag 14. As shown FIGS. 1(*a*) and 2, tongue-shaped seam allowances 48 and 50 protrude from the seam allowances 44 and 46 (FIG. 2 shows only the seam allowance 48). As shown in FIGS. 1(*a*) and 1(*b*), in particular in FIG. 1(*b*), the seam allowances 48 and 50 are stitched with seams 52.

As described above, the opposing surfaces of the right half airbag 12 and the left half airbag 14 are connected at the midsections thereof in the direction of inflation at the seam allowances 44, 46 of the rear inner panel 18 and the front inner panels 22, 24. A distance between a rear end 10e of the inflated airbag and the seams 52 preferably ranges from 30% to 70% of a longitudinal length L of the inflated airbag 10, and more preferably ranges from 40% to 55% of the length L.

A pair of slits 54 for inserting an inflator is formed in the rear outer panel 20 constituting the outer surface of the communicating portion 16. As shown in FIGS. 1(*a*) and 1(*b*), a rod inflator 56 is used in the present embodiment. The rod inflator 56 is inserted into the slits 54 such that the inflator 56 extends through the communicating portion 16 in the width direction of the vehicle. Both ends of the inflator 56 are disposed outside of the airbag 10.

The airbag 10 is installed in an airbag device for protecting a vehicle occupant in the event of vehicle collision. The airbag device includes, for example, a box case with no lid (not shown) for accommodating the airbag 10, and the airbag 10 is connected with the case. As shown in FIG. 1(*b*), holes 58 are formed in the airbag 10 for inserting a fastener (not shown) such as a bolt to fix the airbag 10 to the case. Both ends of the inflator 56 are also attached to the case.

The airbag 10 is folded in the case and a cover such as a lid (not shown) is mounted on the case to cover the folded airbag 10, thus composing the airbag device. The lid is adapted to be torn by a pressing force exerted by the airbag 10 when the airbag is inflated.

The airbag device is installed in, for example, an instrument panel disposed in front of a passenger seat of a vehicle. In the event of vehicle collision, the inflator 56 ejects gas to the communicating portion 16. The gas from the inflator 56 flows in the right half airbag 12 and the left half airbag 14, thereby inflating the right half airbag 12 toward the front right of the occupant and the left half airbag 14 toward the front left of the occupant.

According to the airbag 10, the right half airbag 12 and the left half airbag 14 are inflated from the folded state. Furthermore, the right half airbag 12 and the left half airbag 14 are connected. When one of the half airbags 12 and 14 is inflated faster and the other of the half airbags 14 and 12 is inflated slower, the one half airbag facilitates the other half airbag to be inflated by pulling the other half airbag. As described above, the right half airbag 12 is connected to the left half airbag 14 with the seams 52 at the midsections thereof in the direction of inflation. Therefore, the one half airbag starts to pull the other half airbag from an early stage of inflation. Accordingly, both of the right half airbag 12 and the left half airbag 14 are inflated smoothly and substantially uniformly toward the left and right sides from the early stage of inflation.

In the completely inflated state of the airbag 10, the space 13 is formed between the distal ends of the right half airbag 12 and the left half airbag 14, and the space 13 is open toward the occupant. The inflated right half airbag 12 receives the right side of the occupant's thorax, the left half airbag 14 receives the left side of the occupant's thorax, and a portion around the occupant's breastbone faces the space 13. Therefore, when the occupant plunges into the airbag, a force applied to the portion around the breastbone is decreased. When the airbag receives the occupant, gas in the airbag 10 is discharged through the vent holes 26a and 28a, thereby absorbing an impact.

A process of manufacturing the airbag 10 will be explained next. As shown in FIG. 3(*a*), the rear inner panel 18 and the front inner panel 22 are stitched with the seam 32, and the rear inner panel 18 and the front inner panel 24 are stitched with the seam 34 (FIG. 3(*a*) does not show the seam 34). The rear outer panel 20 and the front outer panel 26 are stitched with the seam 36, and the rear outer panel 20 and the front outer panel 28 are stitched with the seam 38 (FIG. 3(*a*) doe not show the seam 38). The seam allowances 44 and 46 connecting the rear inner panel 18 and the front inner panels 22 and 24 are disposed at the outside of the airbag in the finished state as the airbag device.

In the present embodiment, the seam allowance 44 connects the rear inner panel 18 and the front inner panel 22. As shown in FIG. 3(b), the rear inner panel 18 and the front inner panel 22 are stitched with the seam 32 (32a and 32b) only at both ends of the seam allowance 44. An opening 60 for reversing the airbag is formed between the seam 32a and the seam 32b.

The rear inner panel 18 stitched with the front inner panels 22 and 24, and the rear outer panel 20 stitched with the front outer panels 26 and 28 are overlapped such that outer surfaces of the airbag product face each other. The two stitched components are stitched with the seams 30, 40, and 42 at the peripheries thereof so that an intermediate airbag product is obtained in a reversed state.

The intermediate airbag product is reversed through the opening 60 formed in the seam allowance 44. The joint allowances 48 and 50 of the seam allowances 44 and 46 are stitched with the seams 52, thereby completing the airbag 10 product. When the joint allowances 48 and 50 are stitched, the seams 52 close the opening 60.

As descried above, the airbag 10 is composed of a plurality of the panels. Accordingly, it is possible to form the outer surface of the airbag 10 having a large area and a complicated shape by the relatively small panels.

In the present embodiment, the seam allowances 44 and 46 connecting the rear inner panel 18 and the front inner panels 22 and 24 are joined, so that the right half airbag 12 is connected to the left half airbag 14. Therefore, it is not necessary to provide a tie panel for connecting the right half airbag 12 and the left half airbag 14 in addition to the panels 18, 22 and 24, thereby reducing a cost of the airbag.

In the present embodiment, a pair of slits 54 used as openings for the inflator is disposed in the rear outer panel 20 constituting the communicating portion 16. The rod inflator 56 is inserted into the slits 54, and disposed in the communicating portion 16. The slit openings for the inflator provide superior connection strength of the inflator 56 to the airbag 10.

In the manufacturing process of the airbag of the present embodiment, the opening 60 is provided in the seam allowance 44 for reversing the airbag product. Accordingly, in a case that it is difficult to reverse the intermediate airbag product through the vent hole or the opening of the inflator, in particular, in a case that the opening of the inflator is composed of the slits as described above, it is easy to reverse the intermediate airbag product through the opening 60.

Incidentally, the seams 52 close the opening 60 when the joint allowance 48 is stitched with the joint allowance 50. Therefore, the gas does not leak from the right half airbag 12 and the left half airbag 14 through the opening 60.

The embodiment described above is an example of the present invention, and the present invention is not limited to the embodiments illustrated in the drawings. For example, in the embodiment, the right half airbag 12 and the left half airbag 14 are connected at the base side. Alternatively, the half airbags may be separated. More than two inflators may be provided for inflating the right half airbag and the right half airbag separately. The midsections of the left half airbag and the right half airbag may be connected by a panel, a string, a net and the like. The left half airbag and the right half airbag may have a symmetric or asymmetric shape. The left half airbag and the right half airbag may have the same capacity or different capacities.

Figure 4:
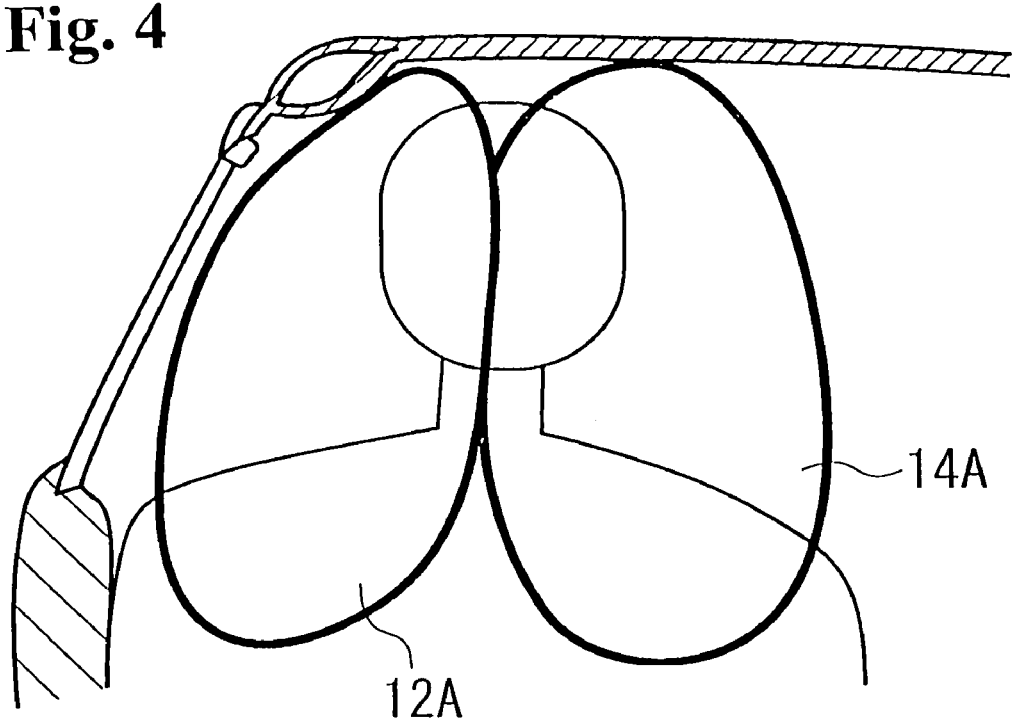
FIG. 4 is a view showing an airbag according to another embodiment of the present invention.

In the present invention, as shown in FIG. 4, a section of the airbag disposed at an A pillar side, i.e. a left half airbag 12A in FIG. 4, may be arranged such that an upper part of the half airbag 12A is inclined in a vehicle cabin, so that the half airbag does not contact the A pillar, a windshield, and a side window.

Figure 5:
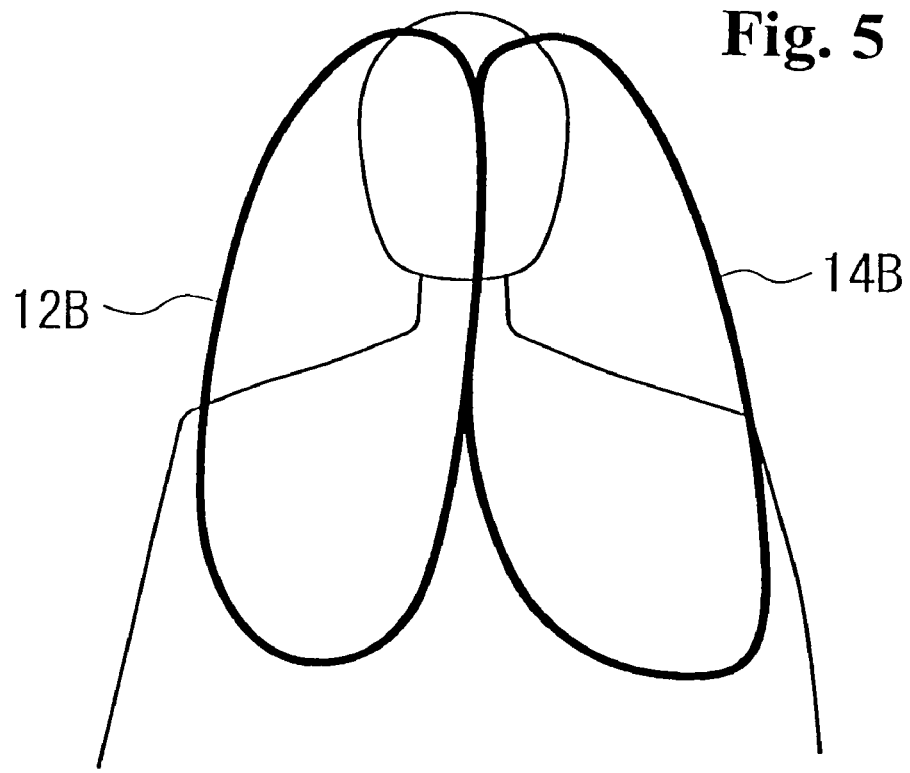
FIG. 5 is a view showing an airbag according to a further embodiment of the present invention.

As shown in FIG. 5, the half airbags may have shapes such that the widths gradually decrease toward the upper parts.

When the airbag of the invention is inflated with a relatively low gas pressure, it is still possible to securely protect the occupant. In particular, when the left and right half airbags have a capacity of more than 45 liter, preferably more than 50 liter, more preferably more than 65 liter, respectively, it is possible to securely protect the occupant even with a low gas pressure. In this case, the inflator may have an output pressure of less than 430 kPa when measured for the inflator itself (tank pressure for 60 liter), less than 400 kPa in some cases, or less than 350 kPa in a specific case. The gas pressure or inner pressure for inflating the airbag may be more than 310 kPa, preferably 360 kPa.

When the airbag of the invention is inflated with a low gas pressure, it is possible to protect the occupant with a constant gas pressure regardless of a weight of the occupant or a speed of the vehicle upon a collision. In a conventional passenger airbag, it is necessary to increase the gas pressure when a weight of the occupant is large or a speed of the vehicle is high upon a collision. In the airbag of the present invention, it is possible to protect the occupant with a constant gas pressure regardless of a weight of the occupant or a speed of the vehicle upon a collision, thereby reducing a cost of the airbag system.

It may be arranged that the inflator is not activated upon a collision when the occupant is an infant. Also, it may be arranged that the inflator is not activated upon a collision when a child seat is mounted on a seat backward. In the present invention, it is possible to install an inflator with multi-step output or a plurality of inflators to regulate the gas pressure according to a weight of the occupant or a speed of the vehicle upon a collision.

Figure 6:
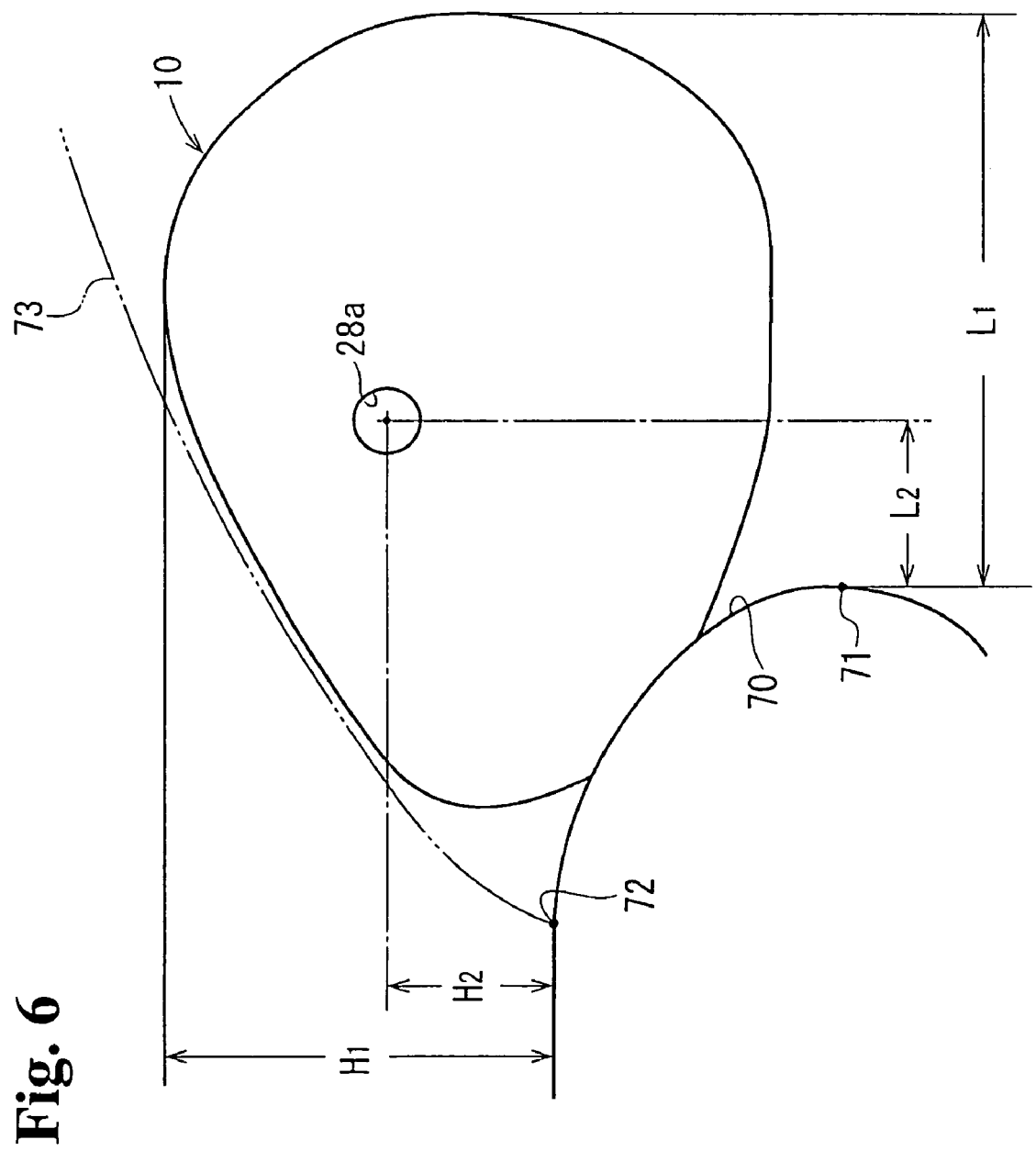
FIG. 6 is a side view showing an airbag having a vent hole.

In FIG. 6, a passenger airbag device is provided with the airbag of the invention having vent holes 26a and 28a at appropriate locations (in FIG. 6, a vent hole 26a is not shown). As shown in FIG. 6, the passenger airbag device is installed on an upper surface of an instrumental panel 70 facing upwardly. The airbag 10 is retained in a container (not shown) in a folded state, and a lid covers a front opening of the container. The lid may be a part of the instrumental panel, or a separate member.

When the airbag 10 is fully inflated, the vent holes 26a and 28a are located in the side surfaces of the airbags 12 and 14 at the areas substantially around the centers thereof or upper front of the centers.

In particular, when a distance L1 is between a rear edge 71 of the instrumental panel (the further most point of the surface of the instrumental panel toward the rear side of the vehicle) and a rear end of the airbag 10 and a distance L2 is between the rear edge 71 of the instrumental panel and centers of the vent holes 26a and 28a, the vent holes are located at the most preferable positions at a ratio L2/L1 of 0.25 to 0.50, more preferably 0.26 to 0.45. When a vertical distance H1 is between an upper edge 72 of the instrumental panel (the upper most point of the surface of the instrumental panel around the airbag device, i.e. closest to a windshield of the vehicle) and an upper end of the airbag 10 and a vertical distance H2 is between the upper edge 72 of the instrumental panel and the centers of the vent holes 26a and 28a, the vent holes are located at the most preferable positions at a ratio H2/H1 of 0.3 to 0.50, more preferably 0.32 to 0.40.

When the vent holes 26a and 28a are located at the most preferable positions, it is possible to prevent the gas discharging through the vent holes 26a and 28a from blowing against the occupant. It is also possible to prevent the vent holes 26a and 28a from closely contacting a surface of a vehicle member such as a side window, an A pillar and the windshield 73. Accordingly, the gas is smoothly discharged through the vent holes 26a and 28a.

Figure 7:
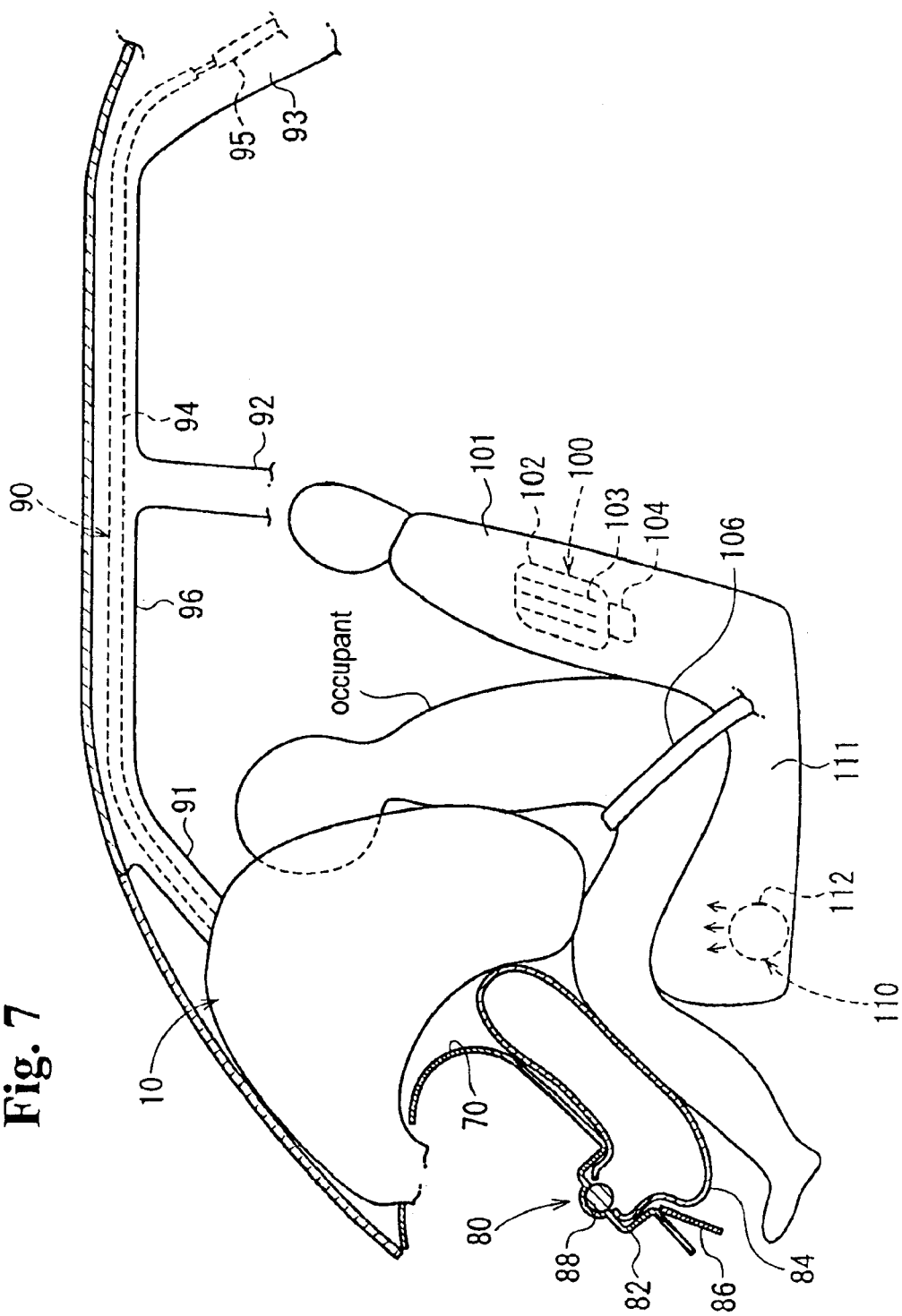
FIG. 7 is a side view showing a vehicle provided with various airbag devices.

The vehicle provided with the airbag device of the invention may be provided with other airbag devices such as a knee airbag device or a knee protector. FIG. 7 is a longitudinal sectional view showing an example of such a vehicle. The passenger airbag device having the passenger airbag 10 of the invention is mounted on the upper surface of the instrumental panel 70. A knee airbag device 80 is mounted under the instrumental panel 70. In this embodiment, a case 82 for a knee airbag is installed in the instrumental panel 70. A knee bag 84 is retained in the case 82 in a folded state and is fixed to the case 82 with a fastener. An inflator (gas generator) 88 is installed in the case 82 for inflating the knee airbag 84. The case 82 has an opening along the instrumental panel 70, and a lid covers the opening.

When the vehicle is collided, the inflator 88 ejects gas to inflate the knee airbag 84. The inflating knee airbag 84 pushes the lid to open, and the knee airbag 84 is expanded along a front surface of the case 82 and the surrounding instrumental panel 70. The knee airbag receives the legs of the occupant for protection.

In this embodiment, when the knee airbag 84 and the airbag 10 are fully inflated (in a case of no occupant), an upper end of the knee airbag 84 is located slightly above a lower end of the airbag 10. The vehicle is further provided with a curtain airbag device 90, a side airbag device 100 and a seat cushion bag device 100. The curtain airbag device 90 includes a curtain airbag 94 extending from an A pillar 91 to a C pillar 93 above a B pillar 92, and an inflator 95 for inflating the curtain airbag 94. The curtain airbag 94 is disposed in a long folded state from the A pillar 91 to the C pillar 93 through a roof side portion 96, and is covered with a pillar garnish and a rood trim.

When the vehicle is collided or rolled over and the inflator is activated, the curtain airbag 94 pushes the pillar garnish and the rood trim and is deployed in the vehicle cabin downwardly along the pillars 91, 92, and 93 and a side door. The expanded curtain airbag 94 receives the occupant to absorb an impact or to prevent the occupant from ejecting out of the vehicle.

The side airbag device 100 is installed in a seatback 101. The side airbag device 100 includes a side airbag 103 retained in a case 102 in a folded state and an inflator 104 for inflating the aide airbag 103. When the vehicle is collided or rolled over and the inflator 104 is activated, the side airbag 103 breaks a seatback cover and is expanded at an upper side of the occupant at a side of the door to protect the occupant. The side airbag device may be installed at a location such as a side door other than the seatback.

The seat cushion bag device 110 includes a seat cushion bag 112 disposed inside a front portion or under a lower portion of a seat cushion 111, and an inflator (not shown) for inflating the seat cushion bag. When the vehicle is collided and the inflator is activated, the seat cushion bag is inflated and pushes the seat cushion 111 upwardly. Accordingly, the front portion of the seat cushion 111 is pushed upwardly or is hardened. As a result, it is possible to prevent the occupant from moving forward. Reference numeral 106 denotes a seat belt (lap belt).

As described above, according to the present invention, the airbag and the airbag device include the left half airbag for receiving the left side of the occupant's thorax, the right half airbag for receiving the right side of the occupant's thorax, and the space disposed between the two half airbags to face the portion around a breastbone of the occupant. In the airbag and the airbag device, both of the left half airbag and the right half airbag are inflated smoothly and substantially uniformly toward the left and right sides from the early stage of inflation.

While the invention has been explained with reference to the specific embodiments of the invention, the explanation is illustrative and the invention is limited only by the appended claims.

What is claimed is:

1. An airbag for protecting an occupant, comprising:
a left half airbag to be inflated at a front left of the occupant and having a distal end and a vertically curved surface projecting toward the occupant in a middle portion thereof when inflated, and
a right half airbag to be inflated at a front right of the occupant and having a distal end and a vertically curved surface projecting toward the occupant in a middle portion thereof when inflated, said distal ends of the left and right half airbags being unconnected and separated from each other to form a space therebetween facing the occupant when the airbag is inflated.

2. An airbag according to claim 1, wherein said distal ends of the left and right half airbags are spaced apart from each other by a distance between 150 and 450 mm, and are located away from a deepest bottom of the space by 280 to 480 mm in a horizontal direction when the airbag is inflated.

3. An airbag according to claim 1, further comprising a base for communicating the left and right half airbags, said left and right half airbags being inflatable by a common inflator.

4. An airbag according to claim 1, wherein said left half airbag is connected with the right half airbag at midsections thereof so that the distal ends of the left and right half airbags are located away from the midsections by 50 to 300 mm in a horizontal direction when the airbag is inflated.

5. An airbag according to claim 4, wherein each of said left half airbag and said right half airbag is formed of a plurality of panels having joint allowances disposed at the midsection, said left half airbag being connected with the right half airbag at the joint allowances.

6. An airbag according to claim 1, wherein at least one of said left half airbag and said right half airbag has an inclined upper portion when the airbag is inflated.

7. An airbag according to claim 1, wherein at least one of said left half airbag and said right half airbag has a width gradually decreasing upwardly when the airbag is inflated.

8. An airbag for protecting an occupant, comprising:
a left half airbag to be inflated at a front left of the occupant and having a distal end and a vertically curved surface projecting toward the occupant in a middle portion thereof when inflated, and
a right half airbag to be inflated at a front right of the occupant and having a distal end and a vertically curved surface projecting toward the occupant in a middle portion thereof when inflated, said distal ends of the left and right half airbags being unconnected and separated from each other to form a space therebetween facing the occupant when the airbag is inflated, wherein each of said left and right half airbags has a vent hole formed at a side surface thereof at a position around a center of the side surface or upper front of the center.

9. An airbag device comprising the airbag according to claim 1 and an inflator for inflating the airbag.

10. An airbag device according to claim 9, wherein said airbag is inflated at a gas pressure less than 440 kPa.

11. A vehicle provided with the airbag device according to claim 9.

12. A vehicle provided with an airbag device comprising an airbag and an inflator for inflating the airbag, said airbag comprising:

a left half airbag to be inflated at a front left of the occupant and having a distal end and a vertically curved surface projecting toward the occupant in a middle portion thereof when inflated , and a right half airbag to be inflated at a front right of the occupant and having a distal end and a vertically curved surface projecting toward the occupant in a middle portion thereof when inflated, said distal ends of the left and right half airbags being unconnected and separated from each other to form a space therebetween facing the occupant when the airbag is inflated, wherein said airbag device is installed in an instrumental panel of the vehicle, and said airbag is a passenger airbag having vent holes in side surfaces thereof facing outwardly so that a ratio $L2/L1$ of a horizontal distance $L1$ between a rear edge of the instrumental panel and the distal ends of the left and right half airbags to a horizontal distance $L2$ between the rear edge of the instrumental panel and the vent holes is between 0.25 to 0.50.

13. A vehicle provided with an airbag device comprising an airbag and an inflator for inflating the airbag, said airbag comprising:

a left half airbag to be inflated at a front left of the occupant and having a distal end and a vertically curved surface projecting toward the occupant in a middle portion thereof when inflated, and a right half airbag to be inflated at a front right of the occupant and having a distal end and a vertically curved surface projecting toward the occupant in a middle portion thereof when inflated, said distal ends of the left and right half airbags being unconnected and separated from each other to form a space therebetween facing the occupant when the airbag is inflated, wherein said airbag device is installed in an instrumental panel of the vehicle, and said airbag is a passenger airbag having vent holes in side surfaces thereof facing outwardly so that a ratio $H2/H1$ of a vertical distance $H1$ between an upper edge of the instrumental panel and an upper end of the airbag to a vertical distance between the upper edge of the instrumental panel and the vent holes is between 0.3 to 0.50.

14. A vehicle according to claim 11, further comprising at least one of a curtain airbag device, a knee airbag device, a knee protector, a side airbag device and a seat cushion bag device.

15. An airbag according to claim 1, wherein each of said vertically curved surfaces of said left and right half airbags has upper and lower portions with respect to the middle portion, respectively, and projects from the upper and lower portions to the middle portion close to a body of the occupant.

* * * * *